Figure 1:
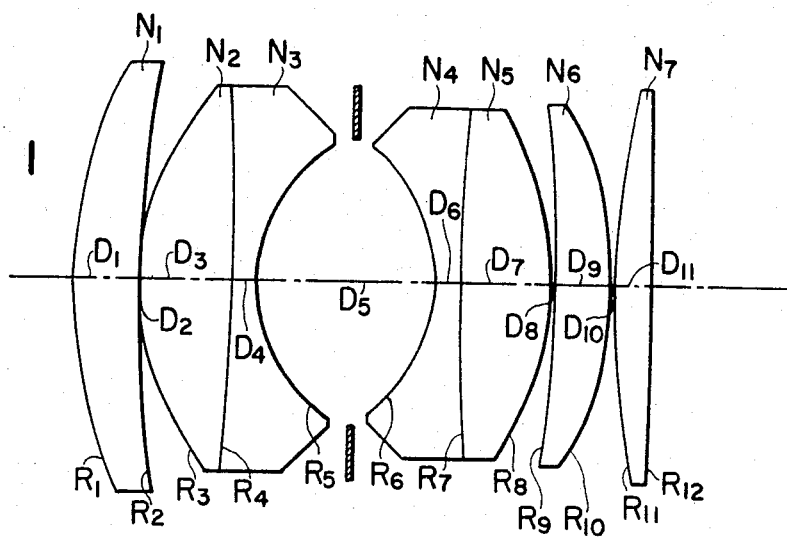

United States

[11] 3,634,001

[72] Inventor  Kunio Shimada
               Tokyo, Japan
[21] Appl. No. 44,193
[22] Filed     June 8, 1970
[45] Patented  Jan. 11, 1972
[73] Assignee  Miranda Camera Company Limited
               Tokyo, Japan
[32] Priority  June 7, 1969
[33]           Japan
[31]           44/44531

[54] MODIFIED GAUSS-TYPE LENS SYSTEM HAVING A LONG BACK FOCAL LENGTH
     6 Claims, 2 Drawing Figs.

[52] U.S. Cl. .................................................. 350/217
[51] Int. Cl. ................................................... G02b 9/60
[50] Field of Search .......................................... 350/217

[56]            References Cited
           UNITED STATES PATENTS
2,735,339   2/1956   Doi .............................. 350/217
                FOREIGN PATENTS
1,055,222   1/1967   Great Britain ................ 350/217

Primary Examiner—John K. Corbin
Attorneys—Robert E. Burns and Emmanuel J. Lobato ABSTRACT: A modified Gauss-type lens system having a long back focal length with a wide aperture is formed from seven lens elements chosen such that the Petzval sum is very small, preferably less than 0.15, and other aberrations are highly corrected. The lens system employs a minimum number of "new-type glass" lenses, which are expensive glass lenses containing rare-earth elements, and may include only one such lens.

PATENTED JAN 11 1972   3,634,001

MODIFIED GAUSS-TYPE LENS SYSTEM HAVING A LONG BACK FOCAL LENGTH

The present invention relates to a modified Gauss-type lens system comprising five components made up of seven separate lens elements.

Conventional lens systems of this type have been applied mainly to a standard lens with a wide aperture for a single lens reflex camera which requires a long back focal length and such have achieved a high degree of performance and effectiveness. A disadvantage of such systems is that they require at least four or five expensive lens elements made of what is known in the art as "new-type glass," which is glass containing rare-earth elements, having a high index of refraction in order to maintain the above-mentioned high performance.

Therefore, an object of the present invention is to provide an improved lens system of the modified Gauss type for a standard lens system by the use of a minimum number of "new-type glass" elements so as to obtain a much higher degree of performance and effectiveness than heretofore obtained by the conventional lens systems employing several "new-type glass" lens elements.

The modified Gauss-type lens system having a long back focal length according to the present invention comprises five components composed of seven distinct lens elements. The lens system is constructed in compliance with the following inequalities, wherein $f$ denotes the focal length for the whole lens system, $D_5$ the axial separation between the fifth surface and the sixth surface, $\nu_3$ and $\nu_4$ denote the Abbe numbers of the third and fourth lens elements respectively, and proceeding from the front to the rear of the lens system, $R_4$ to $R_8$ designate the radii of curvature of the fourth surface to the eighth surface, and $N_2$ to $N_5$ the indices of refraction of the second to the fifth lens elements for the $d$-line.

(1) $N_2, N_5 > 1.69$
(2) $2.1/f < |(1.0-N_3)/R_5| < 2.6/f$
(3) $2.2/f < |(N_4-1.0)/R_6| < 2.6/f$
(4) $\nu_3, \nu_4 < 32.0$
(5) $0.1/f < 1/-R_4 < 1.0/f$
(6) $0.03/f < 1/R_7 < 0.5/f$
(7) $0.29f < D_5 < 0.33f$
(8) $1.4/f < 1.0-N_5/R_8 < 1.8/f$

Figure 2:
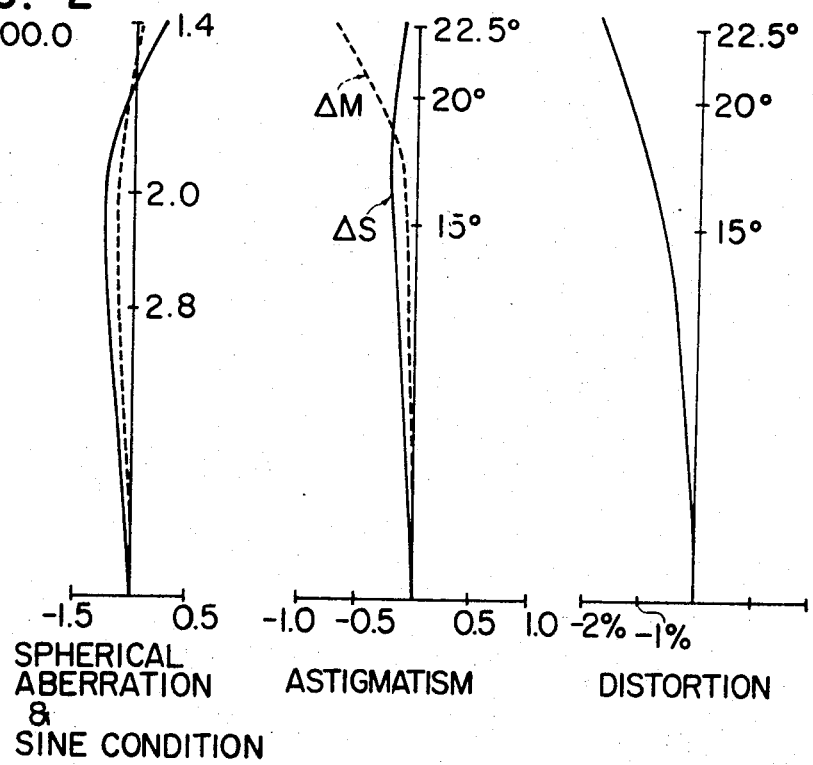

Other objects, advantages and features of the present invention will become more apparent from the following description of an illustrative example when taken in conjunction with the drawings in which:

FIG. 1 is a diagrammatic sectional view of a lens system illustrative of the present invention; and FIG. 2 is a graphical representation of various types of aberrations in one example of the present invention.

The modified Gauss-type lens system according to the present invention comprises five lens components composed of seven separate lens elements. The seven lens elements are axially arranged as shown in FIG. 1 wherein the front of the lens system is at the left-hand end and the rear of the lens system is at the right-hand end. The second and third lens elements are connected together to define a lens doublet and the fourth and fifth lens element are connected together to define another lens doublet.

The refractive indices of the separate lens glasses when measured for the $d$-line of the spectrum are $N_1, N_2...N_7$ for the respective lenses as viewed in a front-to-rear direction.

The Abbe numbers for the glasses of the respective elements when disposed in the same front-to-rear direction are $\nu_1, \nu_2,... \nu_7$. The radii of curvature of the surfaces of the respective lens elements as arranged in the above order are $R_1, R_2,...R_{12}$ and the axial separation between adjacent ones of the above-mentioned surfaces are $D_1, D_2...D_{11}$. The focal length for the entire lens system is $f$.

The refractive indices $N_2$ and $N_5$ of the second and fifth lens glasses must be greater than 1.69 to effectively correct the zonal spherical aberration and the curvature of field. These two lenses have the highest powers of refraction among the converging elements constituting the present lens system and this numerical relationship is represented by condition (1). The other converging lens elements of the present invention lens system are not so influential in controlling the zonal spherical aberration and the curvature of field and therefore their refractive indices need not comply with the inequality expressed by condition (1).

In the first example of the present invention, a new-type glass having a refractive index of 1.734 is used only for the fifth lens element. The second lens element is composed of BaSF$_8$ having a refractive index of 1.72342 and Abbe number of 37.9.

The curvature of field is still unsatisfactorily large even when condition (1) is satisfied and a rather large chromatic aberration also exists since conventional glass having a high degree of dispersion is used in most of the remainder of the lens system. These detrimental effects are corrected by the lens system of the present invention by fulfillment of condition (2). A satisfactory correction of the curvature of field and the chromatic aberration is accomplished by making the absolute value $|1.0-N_3/R_5|$ of the negative refractive power of the fifth surface larger than $2.1/f$ and at the same time, the enlargement of the back focal distance is successfully made without much distortion. It has been found that if the absolute value $|1.0-N_3/R_5|$ exceeds $2.6/f$, then the correction for aberrations, particularly comatic aberration and astigmatism, etc., becomes difficult and hence the inequality $2.1/f < |(1.0-N_3)/R_5| < 2.6/f$ defined by condition (2) must be adhered to. It has been found that condition (2) is the most important one of all the conditions for obtaining the objectives of the present invention.

The parametric condition (3) is also effective for obtaining correction of the curvature of field and the chromatic aberration when taken together with the condition (2). If the absolution value $|N_4-1.0)/R_6|$ of the refractive power of the sixth surface is greater than $2.2/f$, then the above-mentioned corrective effect will be gained. But if this absolute value exceeds $2.6/f$, then the various aberrations, especially a spherical aberration and astigmatism, will be produced and their correction will be difficult to achieve.

The conditions (4), (5) and (6) are additional parametric relationships for further correcting chromatic aberration. The chromatic aberration will be very difficult to correct unless glass having a high degree of dispersion with an Abbe number less than 32 is applied to all the diverging elements of the lens system so that some glass having a high degree of dispersion may be applied to the converging elements of the lens system as in the case in the present invention. Such a relationship is given in condition (4).

The condition (5) is employed for further correcting chromatic aberration. This correction is done by defining that the numerical value condition of the curvature $1/-R_4$ of the fourth surface is larger than $0.1/f$. Conversely, if the curvature of the fourth surface exceeds $1.0/f$, then the chromatic spherical aberration becomes worse. Hence, the inequality $0.1/f < 1/-R_4 < 1.0/f$ is used as represented by condition (5).

Similarly, condition (6) is used to further correct chromatic aberration. Condition (6) requires that the curvature of the seventh surface, $1/R_7$, be larger than $0.03/f$ and smaller than $0.5/f$. If the curvature of the seventh surface is larger than $0.5/f$, then the correction for chromatic spherical aberration will become difficult as in the case of condition (5).

The condition (7) is for the correction of somatic aberration of a higher order. If the numerical value of the axial separation distance $D_5$ between the fifth and sixth surfaces is larger than $0.29f$, then the comatic flare can be reduced. Contrariwise, if the distance $D_5$ is more than $0.33f$, astigmatism occurs to such an extent that it will be difficult to be corrected by adherence to the other conditions. Thus, the condition (7) defined by the inequality $0.29f < D_5 < 0.33f$ is used as a further parameter in the modified Gauss-type lens system according to the present invention.

According to a further aspect of the present invention, the refractive powers of the fifth and sixth surfaces are much stronger than those normally used in conventional lens systems of this type, as stated in the explanation of the conditions (2) and (3). Astigmatism and distortion which result from these fifth and sixth surfaces are corrected by defining a conditional range such that the refractive power $(1.0-N_5)/R_8$ of the eighth surface is larger than $1.4/f$ but less than $1.8/f$, for if it exceeds $1.8/f$, then the correction for spherical aberration will be practically impossible. Thus, condition (8) is given by the expression $1.4/f<(1.0-N_5)/R_8<1.8/f$.

A lens system constructed in compliance with these eight conditions results in a modified Gauss-type lens system having a long back focal length and a wide aperture yielding high performances by the use of only a single "new-type glass" element among the seven lens elements. U.S. Pat. Nos. 3,488,108 and 3,490,825 depict the present state of the prior art and provide a synopsis of the problems which the present invention is intended to overcome.

Examples of three different lens systems constructed in accordance with the present invention will now be described. In the first example, a single piece of "new-type glass" element is used whereas two pieces of "new-type glass" are used in the third example. FIG. 2 shows the graphs of aberrations occurring in the first example wherein a single piece of "new-type glass" element is used and this embodiment of the lens system is therefore the most economical.

EXAMPLE I $f=100.0$ mm.; Back focal length BF=71.06; Aperture ratio=1:1.4

| | |
|---|---|
| $R_1=77.95$ mm. | $D_1=11.55$ mm. |
| $R_2=263.05$ | $D_2=0.19$ |
| $R_3=52.07$ | $D_3=15.78$ |
| $R_4=-327.13$ | $D_4=3.46$ |
| $R_5=31.13$ | $D_5=31.67$ |
| $R_6=-29.94$ | $D_6=3.66$ |
| $R_7=577.29$ | $D_7=15.18$ |
| $R_8=-46.53$ | $D_8=0.35$ |
| $R_9=-216.04$ | $D_9=9.51$ |
| $R_{10}=-61.27$ | $D_{10}=0.19$ |
| $R_{11}=156.14$ | $D_{11}=7.04$ |
| $R_{12}=-657.55$ | |

| | | |
|---|---|---|
| $N_1=1.72342$ | $\nu_1=37.9$ | BaSF$_n$ |
| $N_2=1.72342$ | $\nu_2=37.9$ | BaSF$_n$ |
| $N_3=1.71736$ | $\nu_3=29.5$ | SF$_1$ |
| $N_4=1.71736$ | $\nu_4=29.5$ | SF$_1$ |
| $N_5=1.734$ | $\nu_5=51.3$ | LaKo$_9$ |
| $N_6=1.66672$ | $\nu_6=48.3$ | BaF$_{11}$ |
| $N_7=1.66672$ | $\nu_7=48.3$ | BaF$_{11}$ |

Condition (2): $1.0-N_3/R_5=-2.30/f$
Condition (3): $N_4-1.0/R_6=-2.40/f$
Condition (8): $1.0-N_5/R_8=1.58/f$
Condition (5): $1.0/R_4=-0.3057/f$
Condition (6): $1.0/R_7=0.1732/f$

EXAMPLE II $f=100.0$ mm. BF=73.17; Aperture ratio=1:1.4

| | |
|---|---|
| $R_1=79.64$ mm. | $D_1=11.81$ mm. |
| $R_2=273.0$ | $D_2=0.17$ |
| $R_3=52.37$ | $D_3=14.86$ |
| $R_4=-379.1$ | $D_4=4.04$ |
| $R_5=31.62$ | $D_5=30.1$ |
| $R_6=-30.5$ | $D_6=4.0$ |
| $R_7=1157.1$ | $D_7=14.88$ |
| $R_8=-49.07$ | $D_8=0.36$ |
| $R_9=-252.6$ | $D_9=8.72$ |
| $R_{10}=-61.98$ | $D_{10}=0.17$ |
| $R_{11}=194.8$ | $D_{11}=6.25$ |
| $R_{12}=-409.0$ | |

| | | |
|---|---|---|
| $N_1=1.72342$ | $\nu_1=37.9$ | BaSF$_n$ |
| $N_2=1.72342$ | $\nu_2=37.9$ | BaSF$_n$ |
| $N_3=1.71736$ | $\nu_3=29.5$ | SF$_1$ |
| $N_4=1.71736$ | $\nu_4=29.5$ | SF$_1$ |
| $N_5=1.734$ | $\nu_5=51.3$ | LaK$_{09}$ |
| $N_6=1.6935$ | $\nu_6=50.7$ | LaK$_{0n}$ |
| $N_7=1.66672$ | $\nu_7=48.3$ | BaF$_{11}$ |

EXAMPLE III $f=100.0$ mm.; BF=73.42; Aperture ratio=1:1.4

| | |
|---|---|
| $R_1=79.15$ mm. | $D_1=11.83$ mm. |
| $R_2=260.8$ | $D_2=0.17$ |
| $R_3=52.47$ | $D_3=15.01$ |
| $R_4=-383.0$ | $D_4=4.08$ |
| $R_5=31.1$ | $D_5=30.41$ |
| $R_6=-30.42$ | $D_6=4.04$ |
| $R_7=1169.2$ | $D_7=15.03$ |
| $R_8=-48.57$ | $D_8=0.36$ |
| $R_9=-258.0$ | $D_9=8.81$ |
| $R_{10}=-62.62$ | $D_{10}=0.17$ |
| $R_{11}=204.7$ | $D_{11}=6.32$ |
| $R_{12}=-429.9$ | |

| | | |
|---|---|---|
| $N_1=1.72342$ | $\nu_1=37.9$ | BaSF$_n$ |
| $N_2=1.70154$ | $\nu_2=41.1$ | BaSF$_7$ |
| $N_3=1.68893$ | $\nu_3=31.0$ | SF$_n$ |
| $N_4=1.71736$ | $\nu_4=29.5$ | SF$_1$ |
| $N_5=1.734$ | $\nu_5=51.3$ | LaK$_{09}$ |
| $N_6=1.6935$ | $\nu_6=50.7$ | LaK$_{0n}$ |
| $N_7=1.6935$ | $\nu_7=50.7$ | LaK$_{0n}$ |

The Seidel's coefficients in example I are as follows:
$f=1.0;\quad t_1=0.59394$

| | I | II | III | P | V |
|---|---|---|---|---|---|
| 1 | 0.514 | 0.0954 | 0.0177 | 0.539 | 0.103 |
| 2 | 0.033 | −0.1294 | 0.5176 | −0.160 | −1.365 |
| 3 | −0.008 | −0.0033 | −0.0014 | 0.806 | 0.343 |
| 4 | 0.021 | −0.0208 | 0.0198 | 0.001 | −0.019 |
| 5 | −0.971 | −0.3419 | −0.1203 | −1.342 | −0.515 |
| 6 | −2.464 | 0.7887 | −0.2519 | −1.395 | 0.527 |
| 7 | 0.009 | 0.0147 | 0.0233 | 0.001 | 0.039 |
| 8 | 0.764 | −0.1802 | 0.0425 | 0.910 | −0.225 |
| 9 | −0.009 | 0.0284 | −0.0891 | −0.185 | 0.861 |
| 10 | 1.725 | −0.0193 | 0.0002 | 0.653 | −0.001 |
| 11 | −0.003 | 0.0325 | −0.3166 | 0.256 | 0.588 |
| 12 | 0.581 | −0.2744 | 0.1296 | 0.061 | −0.090 |
| Σ | 0.193 | −0.0105 | −0.0386 | 0.144 | 0.239 |

As is apparent from the Seidel's coefficients and the graphical representation of aberrations shown in FIG. 2, satisfactory results of the correction for aberrations are achieved with the use of a single "new-type glass" element in the first example of the present invention. The correction for comatic aberration and astigmatism are very good, and particularly the curvature of field is very small as the numerical value 0.144 of the Petzval sum indicates. Even when several "new-type glass" elements are employed, the numerical value of the Petzval sum in the conventional lens system is generally about 0.2 or so and thus it can be appreciated that the present invention provides a lens system which effectively corrects for aberrations.

Extremely careful attention is given to the particular curvature of field in the lens system of the present invention and accordingly, the Petzval sum is maintained below 0.15. Generally, the means for making the Petzval sum small are as follows:

A. Using lens glasses having high refractive indices for the converging elements in a lens system.

B. Decreasing the refractive powers of the converging elements or increasing the refractive powers of the diverging elements in a lens system.

C. Leaving wide distances between the adjacent surfaces of the lens elements.

The method of (A) is the easiest way for correcting aberrations, but many expensive "new-type glasses" are required and such defeats the main object of the present invention. According to the present invention, as has already been described in conjunction with condition (1), the glasses of high refractive indices are used for only the two lens elements having the highest powers of refraction in the converging lens elements. In addition, to avoid a high cost of production, a lens glass having a high degree of dispersion is used for only one of these two elements, and accordingly, careful attention is directed to the correction for chromatic aberration.

The decrease of the Petzval sum cannot feasibly be attained by means of technique (C) despite a change for the worse of various aberrations and vignetting. Consequently, the means of (B) is applied to accomplish the present invention.

Experimentation has shown that when the refractive powers of the fifth, sixth and seventh converging lens elements in the rear half of the lens system are decreased, the focal length of the whole lens system greatly increases for the decrease of the Petzval sum. In other words, the refractive powers of the other lens elements must be increased for a given focal length, and such causes a change for the worse of aberrations and moreover, results in a high production cost because of the necessity of severe surface curvature of the lens elements.

A decrease of refractive powers of the first and second converging lens elements in the front half of the lens system does not drastically influence the focal length, but a great deal of distortion does result. To correct such distortion, the distances $D_3$ and $D_4$ are accordingly increased. This results in enlargement of the lens system, as mentioned above, as well as a change for the worse of high order aberration in relation with the angle and a limited angle of field.

With respect to the third and fourth lens elements, the Petzval sum can be decreased with little resulting increase of the focal length and little influence upon aberrations if only the negative powers of refraction of the third and fourth lens elements are increased. This is also effective for correcting chromatic aberration, and the aberrations produced by the above negative powers of refraction may also be corrected by other lens elements.

Thus the present invention has been achieved in view of the above-mentioned principles and provides a modified Gauss-type lens system having a long back focal length in which a high degree of performance can be maintained with a very small Petzval sum. Moreover, the lens system according to the present invention employs a minimum number of "new-type glass" lenses as well as using only two relatively expensive severe curvature lenses, those being the third and fourth lens elements.

What I claim and desire to secure by Letters Patent is:

1. A lens system comprising: seven lens elements axially disposed and numbered along an optical axis in a front-to-rear relationship in accordance with the following parameters:

| Lens Elements | N | ν | Radii (mm.) | Distances (mm.) |
|---|---|---|---|---|
| First | 1.72342 | 37.9 | $R_1$=77.95 | |
| | | | $R_2$=263.05 | $D_1$=11.55 |
| Second | 1.72342 | 37.9 | $R_3$=52.07 | $D_2$=0.19 |
| Third | 1.71736 | 29.5 | $R_4$=−327.13 | $D_3$=15.78 |
| | | | $R_5$=31.13 | $D_4$=3.46 |
| Fourth | 1.71736 | 29.5 | $R_6$=−29.94 | $D_5$=31.67 |
| Fifth | 1.734 | 51.3 | $R_7$=577.29 | $D_6$=3.66 |
| | | | $R_8$=−46.53 | $D_7$=15.18 |
| Sixth | 1.66672 | 48.3 | $R_9$=−216.04 | $D_8$=0.35 |
| | | | $R_{10}$=−61.27 | $D_9$=9.51 |
| Seventh | 1.6672 | 48.3 | $R_{11}$=156.14 | $D_{10}$=0.19 |
| | | | $R_{12}$=−657.55 | $D_{11}$=7.04 | wherein $N$ denotes the respective indices of refraction for the $d$-line of the spectrum, $\nu$ denotes the respective Abbe numbers, $R_1$–$R_{12}$ respectively designate the radius of curvature of consecutive ones of the front and rear surfaces of said seven lens elements with the exception of $R_4$ which designates the radius of curvature of both the rear surface of the second lens element and the front surface of the third lens element and $R_7$ which designates the radius of curvature of both the rear surface of the fourth lens element and the front surface of the fifth lens element, and $D_1$–$D_{11}$ respectively denote the axial distance between consecutive ones of the lens surfaces with the exception of the axial distance between those lens surfaces having the radii or curvature $R_4$ and $R_7$.

2. A lens system comprising: seven lens elements axially disposed and numbered along an optical axis in a front-to-rear relationship in accordance with the following parameters:

| Lens Elements | N | ν | Radii (mm.) | Distances (mm.) |
|---|---|---|---|---|
| First | 1.72342 | 37.9 | $R_1$=79.64 | |
| | | | $R_2$=273.0 | $D_1$=11.81 |
| Second | 1.72342 | 37.9 | $R_3$=52.37 | $D_2$=0.17 |
| Third | 1.71736 | 29.5 | $R_4$=−379.1 | $D_3$=14.86 |
| | | | $R_5$=31.62 | $D_4$=4.04 |
| Fourth | 1.71736 | 29.5 | $R_6$=−30.5 | $D_5$=30.1 |
| Fifth | 1.734 | 51.3 | $R_7$=1157.1 | $D_6$=4.0 |
| | | | $R_8$=−49.07 | $D_7$=14.88 |
| Sixth | 1.6935 | 50.7 | $R_9$=−252.6 | $D_8$=0.36 |
| | | | $R_{10}$=−61.98 | $D_9$=8.72 |
| Seventh | 1.66672 | 48.3 | $R_{11}$=194.8 | $D_{10}$=0.17 |
| | | | $R_{12}$=−409.0 | $D_{11}$=6.25 | wherein $N$ denotes the respective indices of refraction for the $d$-line of the spectrum, $\nu$ denotes the respective Abbe numbers, $R_1$–$R_{12}$ respectively designate the radius of curvature of consecutive ones of the front and rear surfaces of said seven lens elements with the exception of $R_4$ which designates the radius of curvature of both the rear surface of the second lens element and the front surface of the third lens element and $R_7$ which designates the radius of curvature of both the rear surface of the fourth lens element and the front surface of the fifth lens element, and $D_1$–$D_{11}$ respectively denote the axial distance between consecutive ones of the lens surfaces with the exception of the axial distance between those lens surfaces having the radii of curvature $R_4$ and $R_7$.

3. A lens system comprising: seven lens elements axially disposed and numbered along an optical axis in a front-to-rear relationship in accordance with the following parameters:

| Lens Elements | N | ν | Radii (mm.) | Distances (mm.) |
|---|---|---|---|---|
| First | 1.72342 | 37.9 | $R_1$=79.15 | |
| | | | $R_2$=260.8 | $D_1$=11.93 |
| Second | 1.70154 | 41.1 | $R_3$=52.47 | $D_2$=0.17 |
| Third | 1.68893 | 31.0 | $R_4$=−383.0 | $D_3$=15.01 |
| | | | $R_5$=31.1 | $D_4$=4.08 |
| Fourth | 1.71736 | 29.5 | $R_6$=−30.43 | $D_5$=30.41 |
| Fifth | 1.734 | 51.3 | $R_7$=1169.2 | $D_6$=4.04 |
| | | | $R_8$=−48.57 | $D_7$=15.03 |

| | | | | |
|---|---|---|---|---|
| Sixth | 1.6935 | 50.7 | $R_9=-258.0$ | $D_8=0.36$ |
| | | | $R_{10}=-62.62$ | $D_9=8.81$ |
| Seventh | 1.6935 | 50.7 | $R_{11}=204.7$ | $D_{10}=0.17$ |
| | | | $R_{12}=-429.9$ | $D_{11}=6.32$ | wherein N denotes the respective indices of refraction for the d-line of the spectrum, $\nu$ denotes the respective Abbe numbers, $R_1$–$R_{12}$ respectively designate the radius of curvature of consecutive ones of the front and rear surfaces of said seven lens elements with the exception of $R_4$ which designates the radius of curvature of both the rear surface of the second lens element and the front surface of the third lens element and $R_7$ which designates the radius of curvature of both the rear surface of the fourth lens element and the front surface of the fifth lens element, and $D_1$–$D_{11}$ respectively denote the axial distance between consecutive ones of the lens surfaces with the exception of the axial distance between those lens surfaces having the radii of curvature $R_4$ and $R_7$.

4. A lens system comprising; seven lens elements axially disposed along an optical axis in a front-to-rear relationship; the first lens element comprising a meniscus positive lens element, the second lens element a biconvex positive lens element, the third lens element a biconcave negative lens element, the fourth lens element a biconcave negative lens element, the fifth lens element a biconvex positive lens element, the sixth lens element a positive lens element, and the seventh lens element a positive lens element; said second lens element and said third lens element being cemented to each other and defining a lens doublet; said fourth lens element and said fifth lens element being cemented to each other and defining another lens doublet; and wherein the lens elements are constructed substantially according to the following parameter for the lens system at an equivalent focal length of 100 mm. in which the lens elements are consecutively numbered from the front to the rear, N is the index of refractive for the d-line of the spectrum, $\nu$ is the Abbe number, and R, D refer respectively to the radii of curvature of the lens surfaces and the axial distances between the lens surfaces numbered by subscript from front to rear:

| Elements | N | $\nu$ | Radii (mm.) | Distances (mm.) |
|---|---|---|---|---|
| First | 1.72342 | 37.9 | $R_1=77.95$ | |
| | | | $R_2=263.05$ | $D_1=11.55$ |
| Second | 1.72342 | 37.9 | $R_3=52.07$ | $D_2=0.19$ |
| Third | 1.71736 | 29.5 | $R_4=-327.13$ | $D_3=15.78$ |
| | | | $R_5=31.13$ | $D_4=3.46$ |
| Fourth | 1.71736 | 29.5 | $R_6=-29.94$ | $D_5=31.67$ |
| Fifth | 1.734 | 51.3 | $R_7=577.29$ | $D_6=3.66$ |
| | | | $R_8=-46.53$ | $D_7=15.18$ |
| Sixth | 1.66672 | 48.3 | $R_9=-216.04$ | $D_8=0.35$ |
| | | | $R_{10}=-61.27$ | $D_9=9.51$ |
| Seventh | 1.66672 | 48.3 | $R_{11}=156.14$ | $D_{10}=0.19$ |
| | | | $R_{12}=-657.55$ | $D_{11}=7.04$ |

5. A lens system comprising; seven lens elements axially disposed along an optical axis in a front-to-rear relationship; the first lens element comprising a meniscus positive lens element, the second lens element a biconvex positive lens element, the third lens element a biconcave negative lens element, the fourth lens element a biconcave negative lens element, the fifth lens element a biconvex positive lens element, the sixth lens element a positive lens element, and the seventh lens element a positive lens element; said second lens element and said third lens element being cemented to each other and defining a lens doublet; said fourth lens element and said fifth lens element being cemented to each other and defining another lens doublet; and wherein the lens elements are constructed substantially according to the following parameters for the lens system at an equivalent focal length of 100 mm. in which the lens elements are consecutively numbered from the front to the rear, N is the index of refraction for the d-line of the spectrum, $\nu$ is the Abbe number, and R, D refer respectively to the radii of curvature of the lens surfaces and the axial distances between the lens surfaces numbered by subscript from front to rear:

| Elements | N | $\nu$ | Radii (mm.) | Distances (mm.) |
|---|---|---|---|---|
| First | 1.72342 | 37.9 | $R_1=79.64$ | |
| | | | $R_2=273.0$ | $D_1=11.81$ |
| Second | 1.72342 | 37.2 | $R_3=52.37$ | $D_2=0.17$ |
| Third | 1.71736 | 29.5 | $R_4=-379.1$ | $D_3=14.86$ |
| | | | $R_5=31.62$ | $D_4=4.04$ |
| Fourth | 1.71736 | 29.5 | $R_6=-30.5$ | $D_5=30.1$ |
| Fifth | 1.734 | 51.3 | $R_7=1157.1$ | $D_6=4.0$ |
| | | | $R_8=-49.07$ | $D_7=14.88$ |
| Sixth | 1.6935 | 50.7 | $R_9=-252.6$ | $D_8=0.36$ |
| | | | $R_{10}=-61.98$ | $D_9=8.72$ |
| Seventh | 1.66672 | 48.3 | $R_{11}=194.8$ | $D_{10}=0.17$ |
| | | | $R_{12}=-409.0$ | $D_{11}=6.25$ |

6. A lens system comprising; seven lens elements axially disposed along an optical axis in a front-to-rear relationship; the first lens element comprising a meniscus positive lens element, the second lens element a biconvex positive lens element, the third lens element a biconcave negative lens element, the fourth lens element a biconcave negative lens element, the fifth lens element a biconvex positive lens element, the sixth lens element a positive lens element, the seventh lens element a positive lens element; said second lens element and said third lens element being cemented to each other and defining a lens doublet; said fourth lens element and said fifth lens element being cemented to each other and defining another lens doublet; and wherein the lens elements are constructed substantially according to the following parameters for the lens system at an equivalent focal length of 100 mm. in which the lens elements are consecutively numbered from the front to the rear, N is the index of refraction for the d-line of the spectrum, $\sigma$ is the Abbe number, and R, D refer respectively to the radii of curvature of the lens surfaces and the axial distances between the lens surfaces numbered by subscript from front to rear:

| Elements | N | $\nu$ | Radii (mm.) | Distances (mm.) |
|---|---|---|---|---|
| First | 1.72342 | 37.9 | $R_1=79.15$ | |
| | | | $R_2=260.8$ | $D_1=11.93$ |
| Second | 1.70154 | 41.1 | $R_3=52.47$ | $D_2=0.17$ |
| Third | 1.68893 | 31.0 | $R_4=-383.0$ | $D_3=15.01$ |
| | | | $R_5=31.1$ | $D_4=4.08$ |
| Fourth | 1.71736 | 29.5 | $R_6=-30.43$ | $D_5=30.41$ |
| | | | $R_7=1169.2$ | $D_6=4.04$ |

9

| | | |
|---|---|---|
| Fifth | 1.734 | 51.3 |
| | | $R_8=-48.57$ |
| Sixth | 1.6935 | 50.7 |
| | | $R_9=-248.0$ |
| | | $R_{10}=-62.62$ |

$D_7=15.03$
$D_8=0.36$
$D_9=8.81$
$D_{10}=0.17$

10

| | | | |
|---|---|---|---|
| Seventh | 1.6935 | 50.7 | $R_{11}=204.7$ |
| | | | $R_{12}=-429.9$ |

$D_{11}=6.32$

* * * * *